United States Patent
Bina et al.

(10) Patent No.: US 9,335,207 B2
(45) Date of Patent: May 10, 2016

(54) OPTICAL SENSOR AND MOUNTING INTERFACE

(75) Inventors: David Bina, Northfield Center, OH (US); James Cirillo, Cleveland Heights, OH (US); Laird Daubenspeck, Medina, OH (US); Hung phi Nguyen, Olmstead Township, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 352 days.

(21) Appl. No.: 14/000,149

(22) PCT Filed: Feb. 21, 2012

(86) PCT No.: PCT/US2012/025979
§ 371 (c)(1),
(2), (4) Date: Sep. 10, 2013

(87) PCT Pub. No.: WO2012/112994
PCT Pub. Date: Aug. 23, 2012

(65) Prior Publication Data
US 2013/0341496 A1    Dec. 26, 2013

Related U.S. Application Data

(60) Provisional application No. 61/444,435, filed on Feb. 18, 2011.

(51) Int. Cl.
*G01J 1/02*    (2006.01)
*G01D 5/26*    (2006.01)
*G01D 11/24*   (2006.01)

(52) U.S. Cl.
CPC ............... *G01J 1/0271* (2013.01); *G01D 5/26* (2013.01); *G01D 5/268* (2013.01); *G01D 11/245* (2013.01); *Y10T 29/49124* (2015.01)

(58) Field of Classification Search
CPC ......... G01D 5/268; G01D 5/264; G01D 5/26; G01D 11/14; G01D 11/28; G01D 11/24; G01D 11/245; G01J 1/0271; Y10T 29/49127; G01B 11/24; G01B 11/2433; G01B 11/26
See application file for complete search history.

(56) References Cited

U.S. PATENT DOCUMENTS 6,624,900 B1 * 9/2003 Eisenhauer ............ B62D 15/02
                                                    356/614
7,047,865 B2    5/2006 Neumann
(Continued)

FOREIGN PATENT DOCUMENTS

| EP | 1493989 A2 | 1/2005 |
| WO | 0028285 | 5/2000 |
| WO | 2009140503 A1 | 11/2009 |

OTHER PUBLICATIONS

International Search Report and accompanying Written Opinion for WO 2012/112994 A1, May 15, 2012.
(Continued)

*Primary Examiner* — John Lee
(74) *Attorney, Agent, or Firm* — Renner, Otto, Boisselle and Sklar, LLP

(57) ABSTRACT

A sensor includes an enclosure having a housing and a lower cassette that cooperate to provide a sealed volume in which an optical sensor assembly is enclosed and protected. The optical sensor assembly includes a circuit board with a light source and a light detector. The sensor assembly further includes a light pipe that guides light from the sensor onto a target and a lens guides reflected light from the target onto the light detector. Lower ends of the light pipe and the lens are supported by a recess in the lower cassette. Upper ends of the light pipe and the lens are supported by an upper cassette. The upper cassette is positively located and mounted to the circuit board and received in an internal receptacle in the lower cassette. Mounting the lower cassette to the housing encloses the optical sensor assembly in the proper alignment.

15 Claims, 9 Drawing Sheets

(56) References Cited

U.S. PATENT DOCUMENTS

| | | | | |
|---|---|---|---|---|
| 2004/0261283 | A1* | 12/2004 | Falkinger | G01D 5/24442 33/707 |
| 2006/0144217 | A1* | 7/2006 | Neumann | G01D 5/34761 91/1 |
| 2011/0058182 | A1* | 3/2011 | Dubin | G01D 5/268 356/614 |
| 2013/0319223 | A1* | 12/2013 | Bina | G01D 11/245 92/5 R |
| 2013/0341496 | A1* | 12/2013 | Bina | G01D 5/268 250/227.11 |

OTHER PUBLICATIONS

International Preliminary Report on Patentability for PCT/US2012/025979, May 14, 2013.

* cited by examiner

OPTICAL SENSOR AND MOUNTING INTERFACE

RELATED APPLICATIONS

This application claims the benefit of U.S. Provisional Application No. 61/444,435 filed Feb. 18, 2011, which is hereby incorporated herein by reference.

FIELD OF THE INVENTION

The present invention relates to a piston-cylinder assembly having a sensor for detecting the position of a piston rod relative to a cylinder housing, and more particularly to a mounting interface for sensor components that maintains proper location and alignment of an optical train for application in absolute position sensing.

BACKGROUND OF THE INVENTION

Piston-cylinder assemblies are used in various actuator applications throughout industry, such as in construction equipment. Often it is advantageous for an operator to be aware of the specific position of a piston rod in a fluid pressure-operated cylinder since the working member being actuated is generally physically connected to the end of the piston rod.

U.S. Pat. No. 7,047,865, for example, discloses a known actuator with a cylinder housing and a rod that is axially movable relative to the cylinder housing. The actuator also has sensor for absolute position sensing in which light from a light source illuminates a pattern on the rod. The sensor is attached to the cylinder housing and detects light reflected from an adjacent portion of the pattern. The position of the rod relative to the housing is determined from the known position of the sensor relative to the housing and the portion of the pattern detected by the sensor.

In contrast to absolute-position sensors, relative-position sensor systems also are known, but they require periodic "zeroing" to maintain accurate position information. In the event of a power failure, for example, the rod generally must be retracted to a "home" position before being extended again. Depending on the circumstances when the hydraulic cylinder lost power, this might not be practical or even possible. An absolute position sensor always knows the position of the rod, even after a power failure. Knowing absolute position also can be used to more accurately control the actuator extension/retraction.

SUMMARY OF THE INVENTION

The present invention provides an optical sensor that uses mechanical constraints that cooperate in a novel way to provide and maintain proper location, alignment, packaging and mounting of the sensor's optical components and the optical pathways therethrough.

An exemplary sensor provided by the present invention includes a novel enclosure having a housing and a lower cassette that cooperate to provide a sealed volume in which an optical sensor assembly is enclosed and protected. The optical sensor assembly includes a circuit board. The circuit board includes a light source and a light detector. The sensor assembly further includes optical elements along light paths to and from the light source and the light detector. A light pipe guides light from the sensor onto a target and a lens guides reflected light from the target onto the light detector. Lower ends of the light pipe and the lens are supported by the lower cassette. Upper ends of the light pipe and the lens are supported by an upper cassette, particularly in through-holes in the upper cassette. The upper cassette is positively located and mounted to the circuit board and received in an internal receptacle in the lower cassette. Thus each element of the sensor is mechanically positioned and held in place relative to another element in such a way to define optical pathways into and out of the sensor.

More specifically, the present invention provides an optical sensor having a sensor assembly. The sensor assembly includes a circuit board having a light source, a light detector, and one or more locating elements, and a light guidance assembly. The light guidance assembly includes a light pipe for guiding light from the light source and a lens for guiding light to the light detector. The sensor also includes an enclosure having a housing and a lower cassette that cooperate to enclose the sensor assembly. The lower cassette has an internal recess for supporting lower portions of the light pipe and the lens. The sensor further includes an upper cassette interposed between the lower cassette and the circuit board. The upper cassette has one or more locating elements that cooperate with corresponding locating elements on the circuit board to locate the upper cassette relative to the circuit board. The upper cassette also has one or more alignment features that support upper portions of the light pipe and the lens in alignment with the light source and the light detector, respectively. Finally, he lower cassette has an interior receptacle for receipt of the upper cassette.

Exemplary embodiments of the sensor include one or more of the following features.

The lower cassette includes a window that is transparent to the wavelength of light produced by the light source, and one or more of the locating features of the lower cassette position the light pipe and the lens relative to the window. The lower cassette includes a biasing element that biases the light pipe and the lens into a desired position.

The upper cassette includes one or more through-holes for light to pass between the light guidance assembly, the light source, and the light detector. Upper portions of the light pipe and the lens are supported within the through-holes. The locating element in the circuit board includes a socket and a housing for a light source, and the locating element in the upper cassette includes a pin that mates with the socket in the circuit board and a through-hole sized to receive the housing of the light source. The upper cassette has a generally cylindrical shape and the lower cassette includes a cylindrical cavity sized to receive the upper cassette.

The lens includes a gradient-index (GRIN) lens.

The light source includes a light emitting diode (LED).

The light detector includes a charge coupled device (CCD).

The enclosure includes alignment features for mounting the sensor in an appropriate orientation relative to a piston rod of a piston-cylinder actuator.

The present invention also provides a piston-cylinder actuator that includes a piston rod in a piston assembly and a cylinder assembly relative to which the piston assembly moves. The piston rod has a pattern extending along a longitudinal surface of the rod. An optical sensor as set forth above is mounted relative to the cylinder assembly to determine the position of the rod relative to the cylinder assembly from a portion of the pattern detected adjacent the sensor. The sensor's enclosure includes one or more alignment features that cooperate with corresponding alignment features of a mounting surface coupled to the cylinder assembly and at least one connector secures the enclosure to the mounting surface.

The present invention also provides a method of assembling the optical sensor. The method includes the steps of (a)

mounting the upper cassette to the circuit board; (b) installing the light guidance assembly in the lower cassette to form a lower cassette assembly; and (c) mounting the lower cassette assembly to the housing while coupling the light guidance assembly to the upper cassette.

The present invention further provides an optical sensor that includes a sensor assembly with a circuit board having a light source and a light detector, and means for guiding light from the light source and means for guiding light to the light detector. The sensor also includes an enclosure having a housing and a lower cassette that cooperate to enclose the sensor assembly. The lower cassette includes means for positioning elements of the light guidance assembly. An upper cassette is interposed between the lower cassette and the circuit board. The sensor also includes means for locating the upper cassette relative to the circuit board, and means for aligning elements of the light guidance assembly relative to the light source and the light detector.

According to one or more embodiments, the means for guiding light from the light source includes a light pipe, the means for guiding light to the light detector includes a lens, the means for locating the upper cassette relative to the circuit board includes one or more pins on the upper cassette and one or more sockets for closely receiving the pins in the circuit board, a housing for a light source, and a through-hole in the upper cassette for receiving the housing of the light source, and the means for aligning elements of the light guidance assembly includes one or more through-holes in the upper cassette.

Further features of the invention will become apparent from the following detailed description when considered in conjunction with the drawings.

DETAILED DESCRIPTION

Optimal sensor operation requires proper alignment of the optical components to and from the target pattern. The sensor provided by the invention uses mechanical constraints that cooperate in a novel way to align and to help maintain proper alignment of one or more optical elements in a sensor assembly. Accordingly, the sensor includes an upper cassette that is located on a circuit board and then secured to the circuit board via corresponding locating structures on the circuit board and the upper cassette. A lower cassette is then mounted to the sensor housing, receiving the upper cassette in a receptacle and enclosing and protecting the optical elements and assisting in their alignment.

Figure 1:
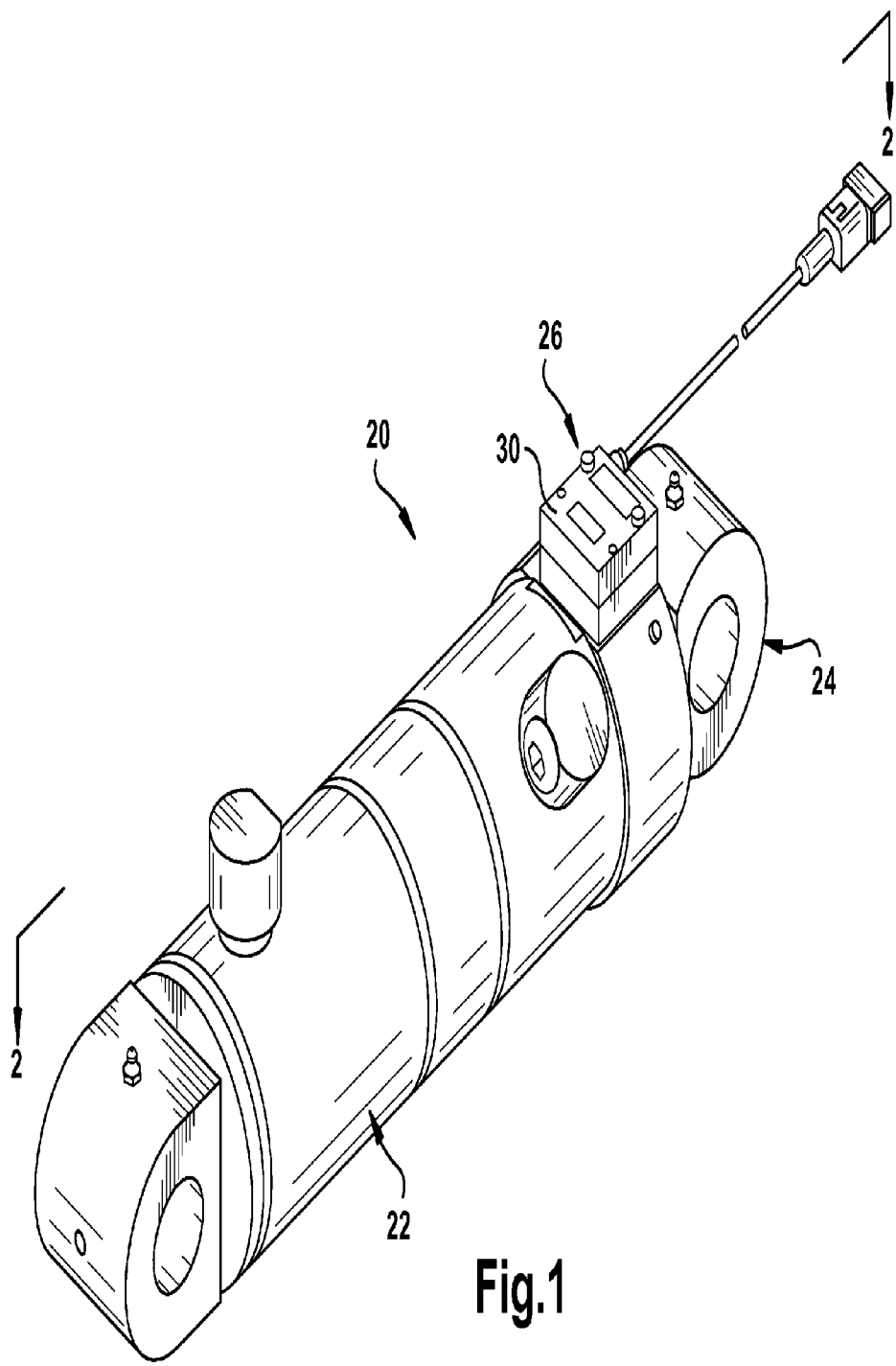
FIG. 1 is perspective view of an actuator with a sensor.
Figure 2:
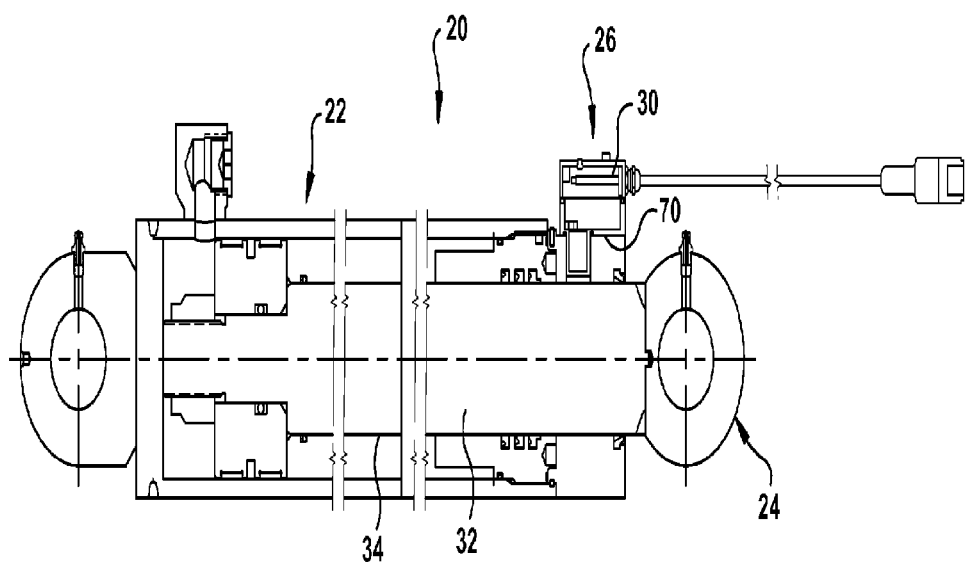
FIG. 2 is a cross-sectional view of the actuator shown in FIG. 1 as seen along lines 2-2.

Referring now to the drawings and initially to FIGS. 1 and 2, an exemplary embodiment of an actuator provided by the invention is shown generally at 20. The actuator 20 includes a cylinder assembly 22, a piston assembly 24 that is movable relative to the cylinder assembly 22, and a sensor assembly 26 with a sensor 30 for detecting the position of the piston assembly 24 relative to the cylinder assembly 22. The piston assembly 24 includes an elongated piston rod 32 that has indicia markings (not shown) provided on at least a longitudinal portion of its peripheral surface 34. These markings include patterns that vary along the length of the rod 32, enabling the sensor 30 to identify the position of the rod 32 from a portion of the pattern adjacent the sensor 30.

Although the invention is described with reference to a piston-cylinder actuator 20, the sensor 30 can be used with hydraulic actuators, pneumatic actuators, rotary actuators, or any other device that requires position sensing, either relative or absolute. Additionally, although the indicia were described as markings on the surface of the rod, the markings can be provided below the surface of the rod, and can be printed, etched, cut, embedded, or otherwise formed in or on the rod, so long as the indicia function to identify a position on the rod.

International Patent Application Publication No. WO 2009/140503, published Nov. 19, 2009, discloses an exemplary absolute position sensor, referred to as a probe. The probe has a housing with a lower casing and an upper casing. A cassette supports an optical assembly.

When compared to the sensor provided by the invention, this construction also adds additional components and manufacturing steps. For example, to maintain a proper alignment of the all the optical components, the internal dimensions of the lower casing and external dimensions of the cassette must be controlled to maintain alignment of the optical pathways. If the dimensions are not properly maintained, the optical paths can be compromised. Without proper alignment, there also is a potential to impart stress on the cassette and thereby in the window. Stress on the window would be likely to induce optical distortion in the window.

Unlike such prior art sensors, the present invention provides a sensor 30 with an integral window in the structure of an enclosure, rather than recessed within the enclosure or provided separately from the enclosure. This simplifies assembly and reduces the number of parts, while also expanding the field of view for the light exiting and entering the sensor 30.

Figure 3:
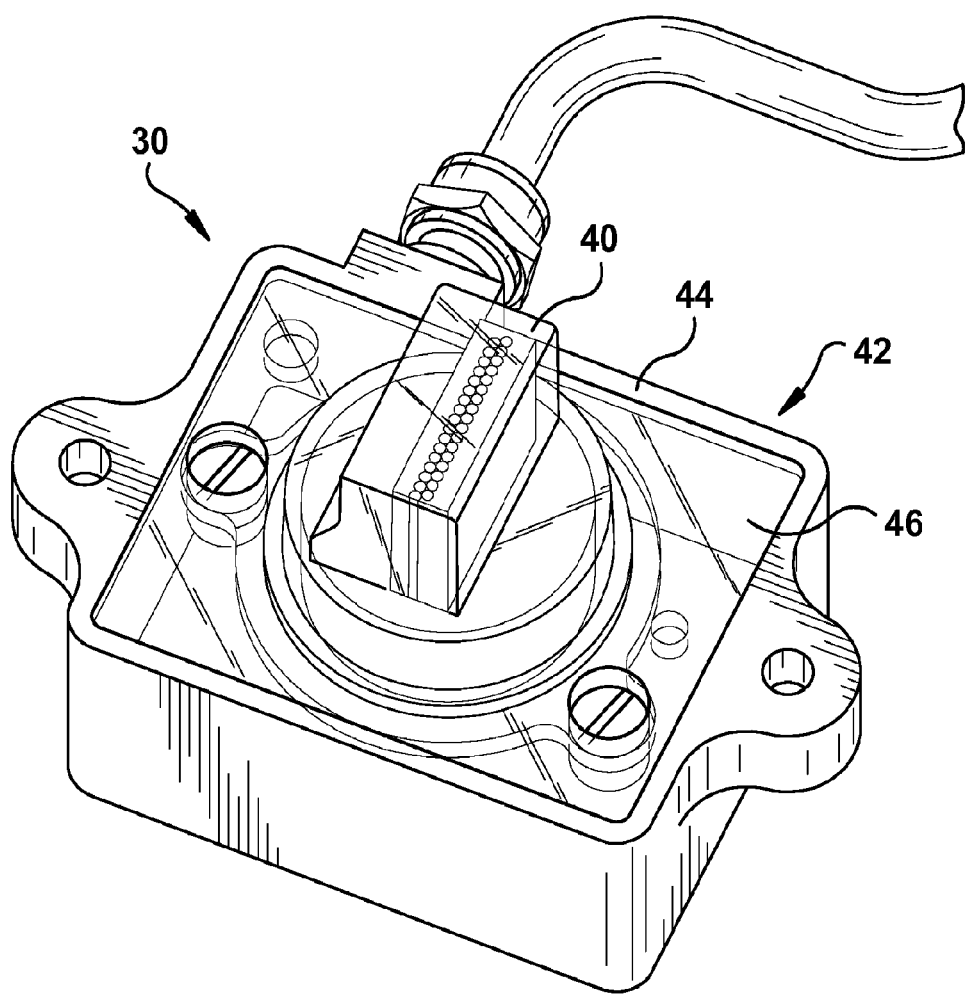
FIG. 3 is a perspective view of a window side of an exemplary sensor provided by the present invention.
Figure 4:
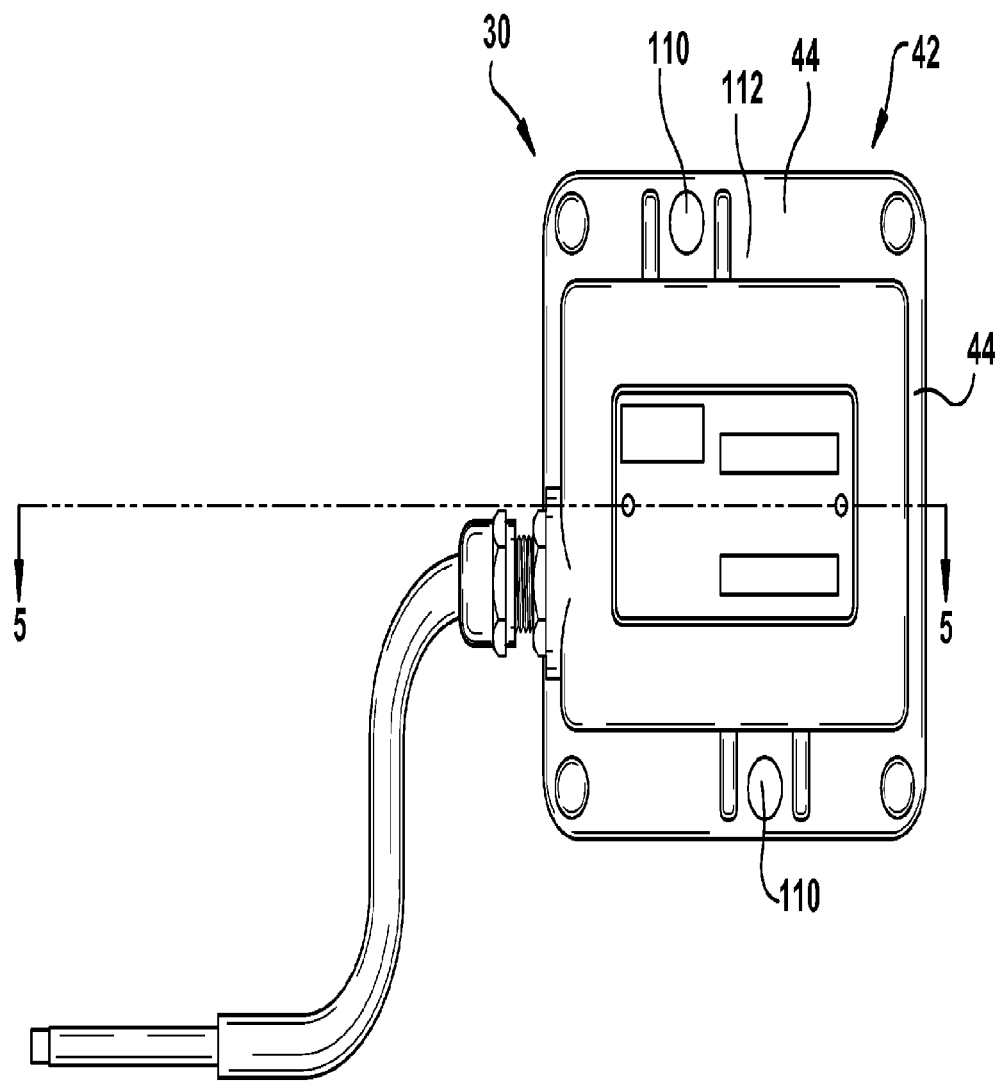
FIG. 4 is a plan view of a housing side of another exemplary sensor provided by the present invention.
Figure 5:
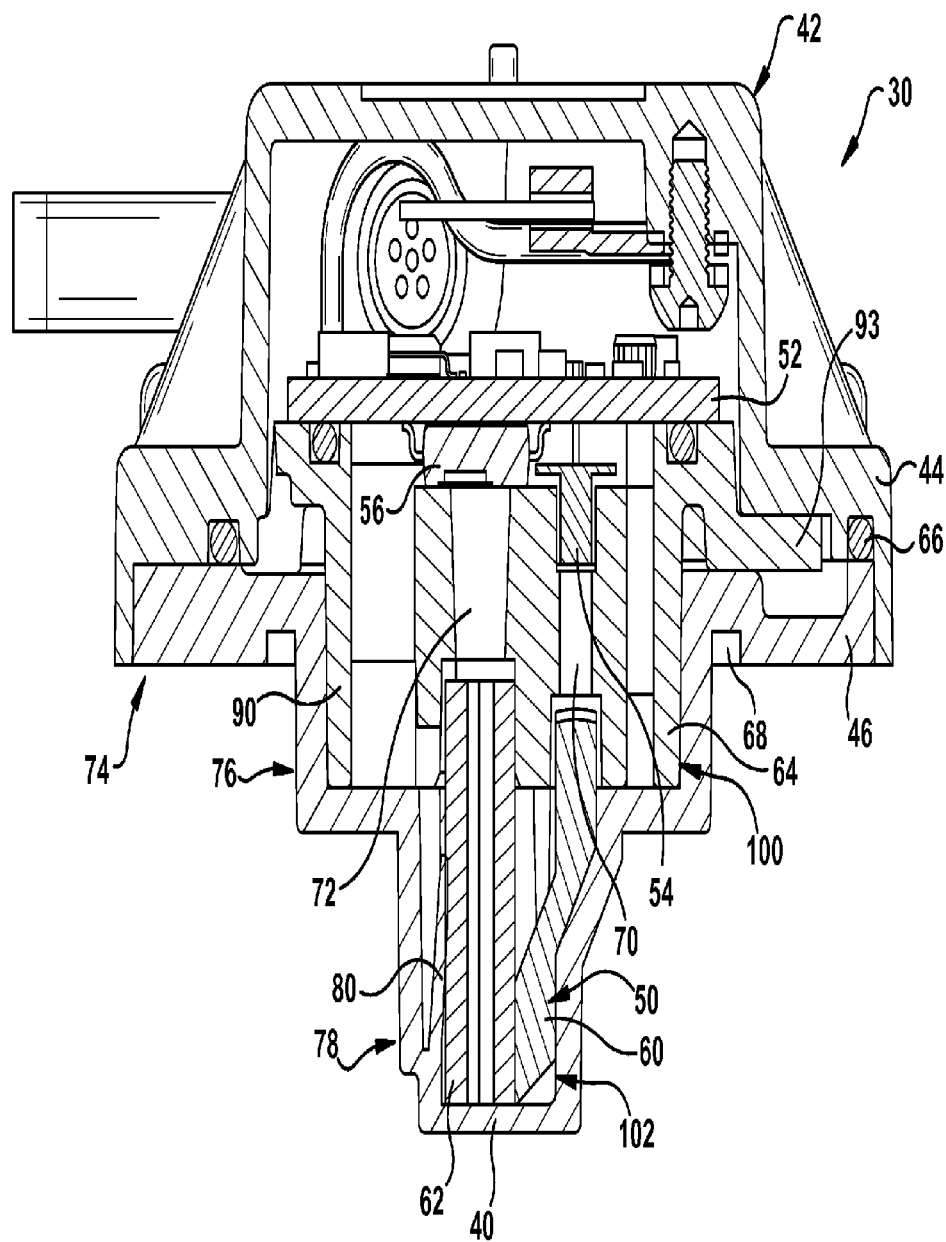
FIG. 5 is a cross-sectional view of the sensor of FIG. 4 as seen along lines 5-5.
Figure 6:
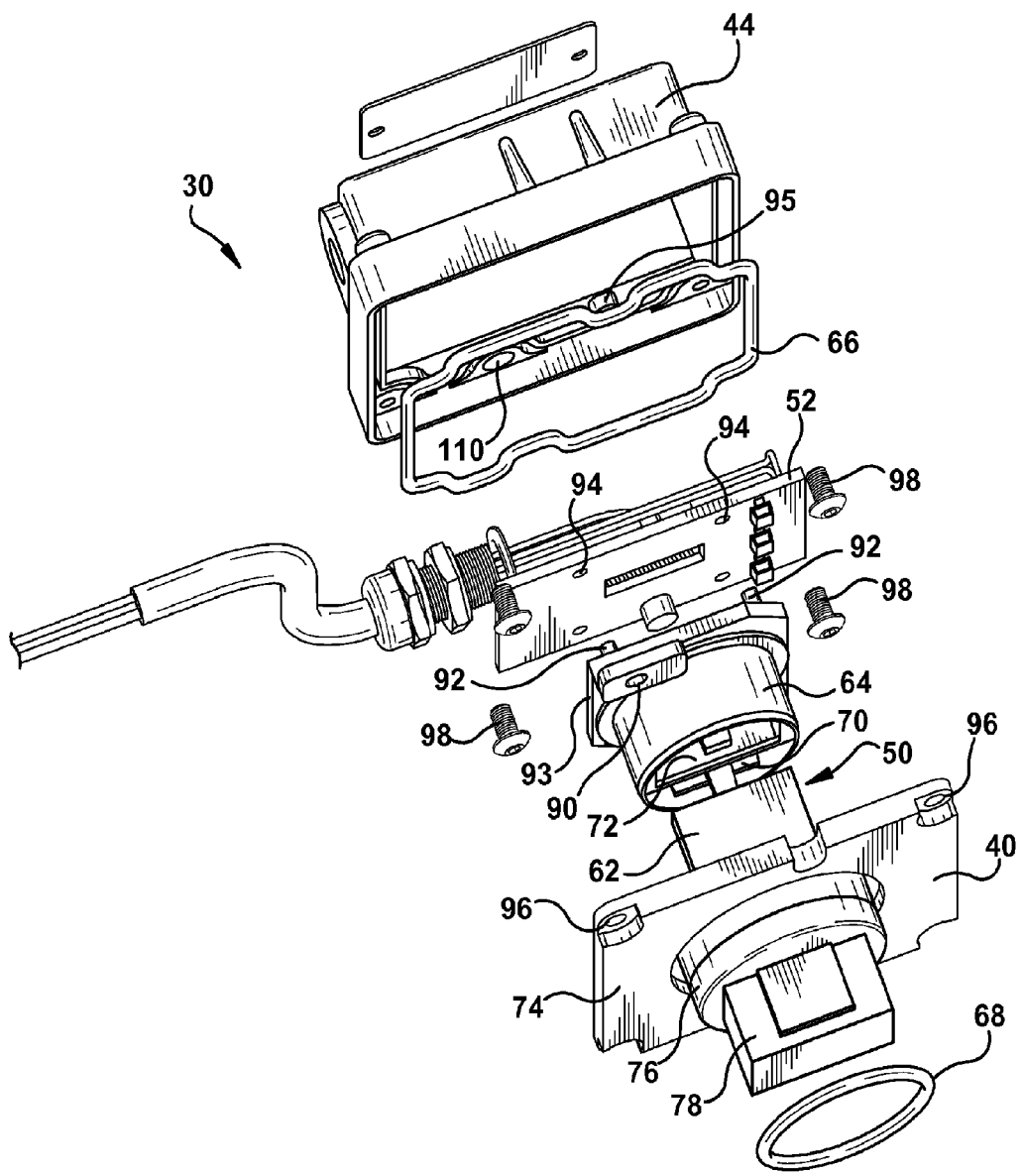
FIGS. 6 and 7 are perspective exploded views of the sensor of FIG. 4.
Figure 7:
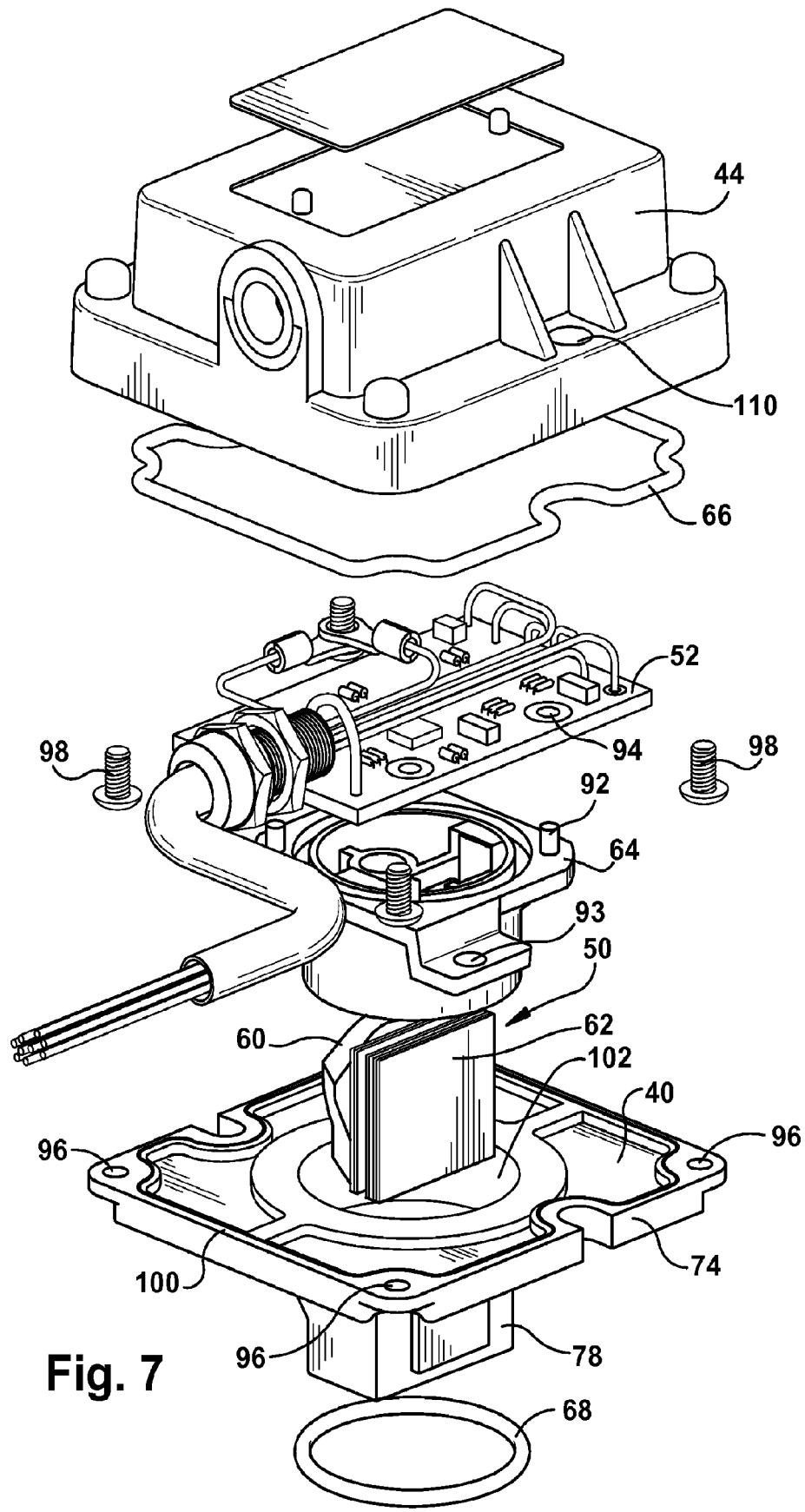

Integrating the window into a structural portion of the enclosure is complicated by the need to maintain optical clarity in the window. As shown in FIG. 3, the enclosure 42 includes a housing 44 and a lower cassette 46 mountable to the housing 44. The housing 44 and the lower cassette 46 cooperate to enclose the sensor assembly 26. The lower cassette 46 typically is made of a plastic or similar moldable material. The lower cassette 46 can be formed in an injection molding process, for example, but the window 40 must be formed without any optical distortion-creating artifacts of the molding process, such as weld lines, gate marks, or other defects that cause optical distortion, particularly non-uniform distortion while still maintaining structural integrity. For these and other reasons, in prior optical sensors, such as those disclosed in Publication No. WO 2009/140503, the window is a separate component or is provided as a separate component from structural portions of the enclosure.

The construction of the sensor provided by the invention also reduces the tolerances required to align the optical components, as the outside dimensions of the lower cassette 46 are no longer relevant to maintaining optical paths between the window, the light detector and the light source.

An exemplary sensor 30 provided by the invention is shown in further detail in FIGS. 3-7. The sensor 30 includes the enclosure 42, composed of the housing 44 and the lower cassette 46, and the sensor assembly 26. The sensor assembly 26 includes a light guidance assembly 50, and a circuit board 52 with a light source 54, such as a light-emitting diode (LED), and a light detector 56, such as a charge-coupled device (CCD).

The light guidance assembly 50 provides means for guiding light from the light source 54 to a target, such as the marked surface 34 of a piston rod 32 (FIG. 2), and for guiding light reflected from the target to the light detector 56. These optical components form a light guidance assembly 50 that defines an optical train arranged along optical pathways between the light source 54 and the light detector 56 as the light travels to and from the target.

An exemplary light guidance assembly 50 includes a light pipe 60 that guides light from the light source 54, typically infrared (IR) or visible wavelengths, and through the window 40 to illuminate the target. An exemplary light guidance assembly 50 also includes a lens, such as a GRIN lens 62, which is formed by an array of glass rods that have a graded index of refraction profile across each individual rod diameter so that the complete array acts like a single lens. The lens 62 is mounted such that it engages the window 40 in the lower cassette 46. The lens 62 guides reflected light from the window 40 to the light detector 56. When the lens 62 is placed at a proper focal distance from the target and the light detector 56, the lens 62 forms a one-to-one image of an adjacent portion of the target on the light detector 56.

The illustrated sensor 30 also includes an upper cassette 64 interposed between the lower cassette 46 and the circuit board 52 to help to ensure the proper alignment of the optical elements of the guidance assembly 50 relative to the light source 54 and the light detector 56 on the circuit board 52. The sensor 30 further includes a seal 66 between the housing 44 and the lower cassette 46, and a seal 68 between the lower cassette 46 and a mounting surface, such as 70 (FIG. 2), typically coupled to the cylinder assembly 22 in a piston-cylinder actuator 20 (FIG. 2).

The upper cassette 64 has a generally cylindrical housing 90 with one or more locating elements that mate with corresponding locating elements on the circuit board 52. In the illustrated embodiment, the upper cassette 64 includes a pair of through-holes 70 and 72 that provide optical pathways through the upper cassette 64. When the upper cassette 64 is aligned with the circuit board 52, these through-holes 70 and 72 are aligned with the light source 54 and the light detector 56, respectively. In particular, an upper portion of the through-hole 70 is sized to receive the light source 54 on the circuit board 52, or more specifically a housing portion of the light source 54 that protrudes from the circuit board 52, thereby providing a means for locating the upper cassette 64 relative to the circuit board 52, and ensuring that the light source 54 is aligned with the through-hole 70. The locating elements on the upper cassette 64 thus include the through-hole 70. The locating elements can further include pins 92 protruding from one end of the cylindrical housing 90 that mate with corresponding locating elements on the circuit board 52, such as the illustrated holes or sockets 94, for receipt of the pins 92. After the pins 92 are placed in the corresponding holes 94, the pins 92 can be heat staked to secure the upper cassette 64 to the circuit board 52. In the illustrated embodiment, the fit between the pins 92 and the holes 94 is relatively loose, allowing for adjustment before being staked to ensure that the light source 54 is aligned with the through-hole 70.

The upper cassette 64 further includes one or more, and preferably at least two ears 93 with holes therein for receipt of corresponding pins 95 protruding from the housing 44. Mating the pins 95 in the holes in the ears 93 thus locates the upper cassette 64 and the circuit board 52 relative to the housing 44, and preventing rotation of the upper cassette 64 relative to the housing 44. Locating elements that position the upper cassette 64 relative to the housing, other than the holes in the ears 93 and pins 95 in the housing 44, are available alternatives. The upper cassette 64 also is coupled to the lower cassette 46.

The illustrated lower cassette 46 includes a peripheral mounting portion 74 that provides a surface with holes 96 for mounting the lower cassette 46 to the housing 44 with one or more screws 98 or other means for fastening the parts together. Protruding from the mounting portion 74 is a cylindrical section 76 that forms an interior receptacle 100 that is dimensioned to receive the upper cassette 64. The lower cassette 46 further includes an extension 78 that further protrudes or extends from the cylindrical section 76 that forms an interior recess 102 for receiving the light pipe 60 and the lens 62. The interior recess further includes a biasing member 80 that helps to hold lower portions of the light pipe 60 and the lens 62 in the recess 102. The distal end of this extension 78 is provided by the window 40. In assembly, the lower cassette 46 extends away from the housing 44, and the window 40 forms the distal portion of the lower cassette 46, where it provides an unobstructed view to the target.

The inside dimension of the receptacle 100 formed in the cylindrical section 76 of the lower cassette 46 and the outside dimension of the housing 90 of the upper cassette 64 are important for ensuring proper alignment of the optical pathways from the light source 54, through the through-hole 70 and the light pipe 60 and then the window 40 to a target, and then back through the window 40 to the lens 62 and the through-hole 72 to the light detector 56.

The sensor 30 provided by the invention includes mechanical constraints for aligning the components of that define the optical pathways. The sensor 30 first includes means for aligning the optical components relative to the circuit board 52. The upper cassette 64 thus is mounted to the circuit board 52 relative to the through-hole 70 and the housing for the light source 54, and secured in place by heat staking the locating pins 92 that mate with corresponding locating sockets 94 in the circuit board 52. The upper cassette 64 is then positioned relative to the housing 44 via the holes in the ears 93 and corresponding pins 95 in the housing 44.

The guidance assembly 50 components, in this case the light pipe 60 and the GRIN lens 62, are placed in the internal recess 102 in the extension 78 portion of the lower cassette 46 in optical contact with the window 40. The sides of the extension 78 and the biasing member 80 cooperate to hold the lower portions of the light pipe 60 and the lens 62 in place. The assembled lower cassette 46 and the optical components 60 and 62 are mated with the upper cassette 64, the circuit board 52, and the housing 44 to complete the assembly of the sensor 30. In the process, the lens 62 and the light pipe 60 are received in and supported by cavities in the upper cassette 64 formed by lower portions of the through-holes 70 and 72. When the upper cassette 64 is aligned with the circuit board 52, these through-holes 70 and 72 are aligned with the light source 54 and the light detector 56, respectively. The upper cassette 64 also includes alignment elements that define the through-holes 70 and 72, and these alignment elements engage upper portions of the light pipe 60 and the lens 62 to align them relative to the light source 54 and the light detector 56 and maintain the proper spacing therebetween. When the lower cassette 46 is mounted to the housing 44, the upper cassette 64 is received in the receptacle 100 in the lower cassette 46, thereby aligning the lower cassette 46 with the circuit board 52 via the upper cassette 64.

Thus, the sensor provided by the invention uses mechanical constraints to locate, align, package and mount the sensor's optical components. The lower cassette 46 and the housing 44 cooperate to enclose and protect the sensor assembly 26. The lower cassette 46 also has internal features that locate lower portions of the light pipe 60 and the lens 62, and locate the upper cassette 64. The upper cassette 64, mounted to the circuit board to align its through-holes 70 and 72 with the light source 54 and light detector 56, in turn aligns and supports upper portions of the light pipe 60 and the lens 62 with the light source 54 and the light detector 56, respectively.

Figure 8:
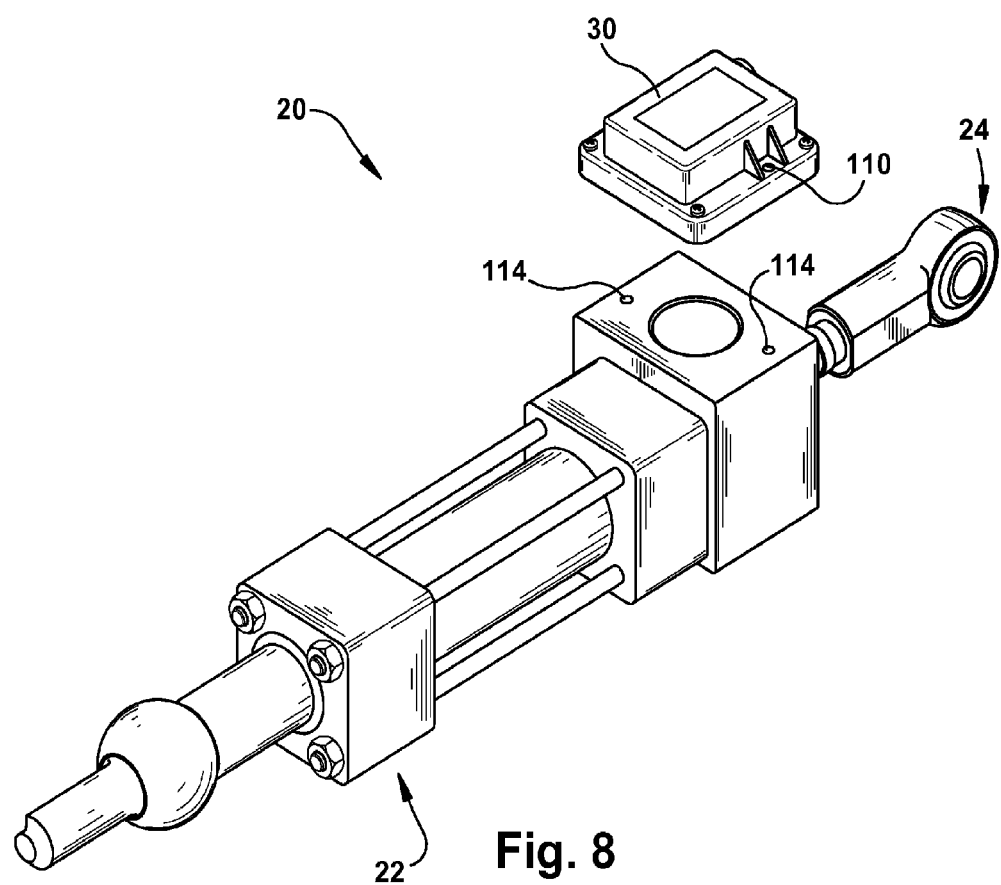
FIG. 8 is a perspective view of a sensor provided by the invention and its mounting location relative to an actuator.
Figure 9:
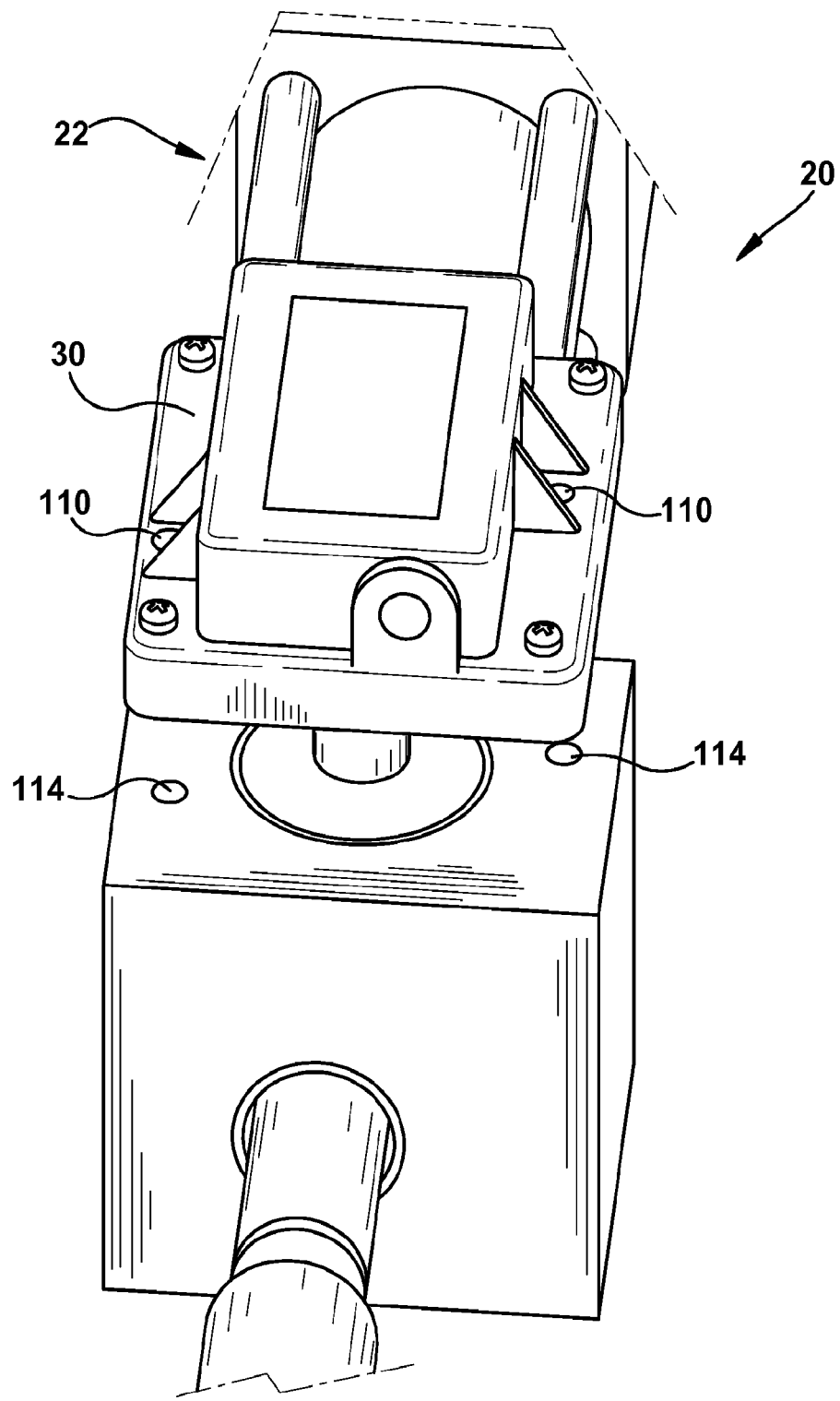
FIG. 9 is an enlarged perspective view of an opposite side of the sensor and actuator of FIG. 8.

In application, as shown in FIGS. 8 and 9, the assembled sensor 30 is then mounted to the cylinder assembly 22 of the actuator 20. The arrangement of locating pins, screws, or other features connecting the sensor enclosure 42 to the cylinder assembly 22 is used to ensure that the sensor 30 can only be mounted to the cylinder assembly in one position and orientation. As seen in the sensor 30 of FIG. 4, the housing 44 includes mounting holes 110 on opposing sides of the housing 44 that are offset from a midline 112. Consequently, these holes 110 will align with corresponding mounting holes 114 in the cylinder assembly 22 in only one orientation of the sensor housing 44. Suitable fasteners (not shown), such as screws, can be used to secure the sensor housing 44 to the cylinder assembly 22. In this way all of the optical components of the sensor 30 are not only aligned with each other, but with the cylinder assembly 22, and thus the piston rod 32 whose position the sensor 30 is used to detect.

In summary, the present invention provides a sensor 30 that includes an enclosure 42 having a housing 44 and a lower cassette 46 that cooperate to provide a sealed volume in which an optical sensor assembly 50 is enclosed and protected. The optical sensor assembly 50 includes a circuit board 52 with a light source 54 and a light detector 56. The sensor assembly 50 further includes a light pipe 60 that guides light from the sensor 30 onto a target and a lens 62 that guides reflected light from the target onto the light detector 56. Lower ends of the light pipe and the lens are supported by a recess 102 in the lower cassette 46. Upper ends of the light pipe 60 and the lens 62 are supported by an upper cassette 64. The upper cassette 64 is positively located and mounted to the circuit board 52 relative to the light source 54 and is received in an internal receptacle 100 in the lower cassette 46. Mounting the lower cassette 46 to the housing 44 encloses the optical sensor assembly 50 in the proper alignment.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical sensor, comprising:

a sensor assembly that includes a circuit board having a light source, a light detector, and one or more locating elements on the circuit board; and a light guidance assembly having a light pipe for guiding light from the light source and a lens for guiding light to the light detector;

an enclosure having a housing and a lower cassette that cooperate to enclose the sensor assembly, the lower cassette having an internal recess for supporting lower portions of the light pipe and the lens; and an upper cassette-interposed between the lower cassette and the circuit board, the upper cassette having one or more locating elements that cooperate with corresponding locating elements on the circuit board to locate the upper cassette relative to the circuit board, the locating elements on the circuit board and on the upper cassette form mechanical constraints that cooperate to align and to maintain alignment of the light source and the light detector and to secure the upper cassette to the circuit board via the corresponding locating elements on the circuit board and the upper cassette, the upper cassette having one or more alignment features that support upper portions of the light pipe and the lens in alignment with the light source and the light detector, respectively; the lower cassette having an interior receptacle for receipt of the upper cassette.

2. A sensor as set forth in claim 1, where the lower cassette includes a window that is transparent to the wavelength of light produced by the light source, and one or more of locating features of the lower cassette that position the light pipe and the lens relative to the window.

3. A sensor as set forth in claim 2, where the lower cassette includes a biasing element that biases the light pipe and the lens-into a desired position.

4. A sensor as set forth in claim 1, where the upper cassette includes one or more through-holes for light to pass between the light guidance assembly, the light source, and the light detector, upper portions of the light pipe and the lens being supported within the through-holes.

5. A sensor as set forth in claim 1, where the one or more locating elements on the circuit board include the light source, and a corresponding one of the one or more locating elements on the upper cassette includes an upper portion of a through-hole in the upper cassette.

6. A sensor as set forth in claim 5, where the one or more locating elements on the circuit board include a socket, and a corresponding one of the one or more locating elements on the upper cassette includes a pin that mates with the socket in the circuit board, and after adjustment to ensure that the light source is aligned, the pin being heat staked to secure the upper cassette to the circuit board.

7. A sensor as set forth in claim 1, where the upper cassette has a generally cylindrical shape and the lower cassette includes a cylindrical cavity sized to receive the upper cassette.

8. A sensor as set forth in claim 1, where the lens-includes a gradient-index (GRIN) lens.

9. A sensor as set forth in claim 1, where the light source includes a light emitting diode (LED).

10. A sensor as set forth in claim 1, where the light detector includes a charge coupled device (CCD).

11. A sensor as set forth in claim 1, where the enclosure includes alignment features for mounting the sensor in an appropriate orientation.

12. A piston-cylinder actuator, comprising a piston rod in a piston assembly and a cylinder assembly relative to which the piston assembly moves, the piston rod having a pattern extending along a longitudinal surface of the rod, and an optical sensor as set forth in claim 1 mounted relative to the cylinder assembly to determine the position of the rod relative to the cylinder assembly from a portion of the pattern detected adjacent the sensor, where the sensor's enclosure includes one or more alignment features that cooperate with corresponding alignment features of a mounting surface coupled to the cylinder assembly and at least one connector securing the enclosure to the mounting surface.

13. A method of assembling the optical sensor of claim 1, comprising the steps of mounting the upper cassette to the circuit board; installing the light guidance assembly in the lower cassette to form a lower cassette assembly; and mounting the lower cassette assembly to the housing while coupling the light guidance assembly to the upper cassette.

14. An optical sensor, comprising:
- a sensor assembly that includes a circuit board having a light source, and a light detector; and means for guiding light from the light source and means for guiding light to the light detector;
- an enclosure having a housing and a lower cassette that cooperate to enclose the sensor assembly, the lower cassette including means for positioning elements of the light guidance assembly;
- an upper cassette interposed between the lower cassette and the circuit board;
- means for locating the upper cassette relative to the circuit board that includes locating elements on the circuit board and on the upper cassette that form mechanical constraints that cooperate to align and maintain alignment of the light source and the light detector and to secure the upper cassette to the circuit board via the corresponding locating elements on the circuit board and the upper cassette; and
- means for aligning elements of the light guidance assembly relative to the light source and the light detector.

15. An optical sensor as set forth in claim 14, where the means for guiding light from the light source includes a light pipe, the means for guiding light to the light detector includes a lens, means for locating the upper cassette relative to the circuit board includes a through hole and one or more pins on the upper cassette and the light source and one or more sockets for closely receiving the pins in the circuit board when the pins have been heat staked in the sockets, and the means for aligning elements of the light guidance assembly include one or more through-holes in the upper cassette.

* * * * *